United States Patent
De Godoi (10) Patent No.: US 8,762,250 B2
(45) Date of Patent: Jun. 24, 2014

(54) ASSET MANAGEMENT SYSTEM TO MONITOR AND CONTROL GREENHOUSE GAS EMISSIONS

(75) Inventor: Alisson Negrisolo De Godoi, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 13/180,871

(22) Filed: Jul. 12, 2011

(65) Prior Publication Data

US 2012/0010917 A1    Jan. 12, 2012

(30) Foreign Application Priority Data

Jul. 12, 2010  (CA) ...................................... 2707254

(51) Int. Cl.
G06Q 10/00   (2012.01)
(52) U.S. Cl.
USPC .................................. 705/37; 705/12; 705/28
(58) Field of Classification Search
USPC .............................. 705/7, 7.27, 7.37, 7.12, 28
See application file for complete search history.

(56) References Cited

U.S. PATENT DOCUMENTS

| | | | | |
|---|---|---|---|---|
| 5,272,769 | A * | 12/1993 | Strnatka et al. ............... | 715/804 |
| 5,311,562 | A * | 5/1994 | Palusamy et al. ............. | 376/215 |
| 7,343,341 | B2 * | 3/2008 | Sandor et al. .................. | 705/37 |
| 7,937,280 | B1 * | 5/2011 | Leung et al. ...................... | 705/6 |
| 2002/0133363 | A1 * | 9/2002 | Bozich et al. .................... | 705/1 |
| 2006/0020502 | A1 * | 1/2006 | Trout et al. ....................... | 705/9 |
| 2006/0020544 | A1 * | 1/2006 | Kaveski ........................... | 705/40 |
| 2007/0173993 | A1 * | 7/2007 | Nielsen et al. .................. | 701/35 |
| 2007/0250329 | A1 * | 10/2007 | Richards et al. .................. | 705/1 |
| 2007/0260405 | A1 * | 11/2007 | McConnell et al. ............. | 702/24 |
| 2007/0294102 | A1 * | 12/2007 | McMorris et al. ................ | 705/1 |
| 2008/0015976 | A1 * | 1/2008 | Sandor et al. ................... | 705/37 |
| 2008/0147465 | A1 * | 6/2008 | Raines et al. ..................... | 705/7 |
| 2008/0183523 | A1 * | 7/2008 | Dikeman ......................... | 705/7 |
| 2008/0255899 | A1 * | 10/2008 | McConnell et al. .............. | 705/7 |
| 2009/0063231 | A1 * | 3/2009 | Campo et al. ..................... | 705/8 |
| 2009/0132176 | A1 * | 5/2009 | McConnell et al. ............ | 702/23 |
| 2009/0171975 | A1 * | 7/2009 | McConnell et al. ............ | 707/10 |

(Continued)

FOREIGN PATENT DOCUMENTS

GB   2345166 A   6/2000
WO   2010037088 A2   4/2010

OTHER PUBLICATIONS

Networkfleet Best Practices, A Guide for Maximizing Financial and Environmental ROI with Networkfleet, 2009, p. 1-22.*

(Continued)

Primary Examiner — Justin M Pats
Assistant Examiner — Venay Puri
(74) Attorney, Agent, or Firm — David W. Victor; Konrad, Raynes, Davda and Victor LLP (57) ABSTRACT

A method for facilitating greenhouse gas emission control in an enterprise is disclosed herein. In one embodiment, such a method may include taking an inventory of GHG-producing assets of an enterprise and monitoring the GHG emission rate for each of the GHG-producing assets. If the GHG emission rate for a specific GHG-producing asset exceeds a specified rate limit, or if the growth rate of the GHG emission rate for the specific GHG-producing asset exceeds a specified growth rate limit, maintenance may be automatically scheduled for that GHG-producing asset.

27 Claims, 5 Drawing Sheets

(56) References Cited

U.S. PATENT DOCUMENTS

| | | | |
|---|---|---|---|
| 2009/0177505 A1* | 7/2009 | Dietrich et al. | 705/7 |
| 2009/0307037 A1* | 12/2009 | King | 705/8 |
| 2010/0145629 A1* | 6/2010 | Botich et al. | 702/23 |
| 2010/0324956 A1* | 12/2010 | Lopez et al. | 705/7 |
| 2011/0137691 A1* | 6/2011 | Johnson | 705/5 |

OTHER PUBLICATIONS

Networkfleet: Go Green and Save Green, Wireless Fleet Management Cuts Emissions While Reducing Operating Costs, 2008, p. 1-11.*

WEXSMART, Secure Mobile Asset Reporting and Tracking, 2007, p. 1-20.*

Networkfleet: Optimizing Fleet Maintenance with Wireless Vehicle Management, 2008, p. 1-8.*

Networkfleet: Connect with Your Fleet. Log on., 2003, p. 1-4.*

Meissen, Ronald E., et al., Alignment of Greenhouse Gas Reduction Activities with Business Strategy, 2005, pp. 487-489, http://ieeexplore.ieee.org/xpl/freeabs_all.jsp?arnumber=1619273.

Bomberg, Matthew S., et al., Greenhouse Gas Emission Control Options: Assessing Transportation and Electricity Generation Technologies and Policies to Stabilize Climate Change, Jan. 2008, http://www.ce.utexas.edu/prof/kockelman/public_html/TRB09GHGlongrunOpportunities.pdf, Washington DC, USA.

Worrell, Ernst, et al., Industrial Energy Efficiency and Climate Change Mitigation, Energy Efficiency, Nov. 30, 2008, pp. 109-123, Nov. 30, 2008, http://www.springerlink.com/content/062l622866w12726/.

\* cited by examiner

ASSET MANAGEMENT SYSTEM TO MONITOR AND CONTROL GREENHOUSE GAS EMISSIONS

BACKGROUND

The invention relates to asset management systems, and more particularly, to asset management systems for tracking, storing, and utilizing greenhouse gas emission information to facilitate reductions in greenhouse gas emissions.

For the past several hundred years, increasing deforestation and burning of fossil fuels, such as coal and oil, have resulted in an extreme increase in the concentrations of heat-trapping "greenhouse gases" in our atmosphere. The implications of this rise in greenhouse gases have recently been brought to the forefront by political and environmental initiatives.

The Intergovernmental Panel on Climate Change ("IPCC"), a scientific intergovernmental body tasked with evaluating the risk of climate change, has concluded that most of the observed temperature increase since the middle of the twentieth century is very likely due to increased concentrations of greenhouse gases resulting from human activity. Consumers have since become more selective in purchasing "green" products having a reduced impact on greenhouse gas emissions and climate change. In turn, large corporations and industries increasingly strive to offer more ecologically-sound products and industrial processes to comply with environmental regulations and to remain competitive in the global market.

To track national trends in emissions and removals since 1990, the U.S. Environmental Protection Agency ("EPA") develops the official U.S. greenhouse gas inventory each year. In addition to the U.S. inventory, greenhouse gas ("GHG") emissions can be tracked at global, state, and local levels, as well as by companies and individuals, according to known methods. This information may be used to facilitate targeted reduction in actual GHG emissions, as well as to facilitate emissions trading and other GHG emission-limiting practices, such as those promoted by the Kyoto Protocol.

What are needed are apparatus and methods for efficiently gathering and using GHG emission information to reduce current and/or future GHG emissions.

BRIEF SUMMARY

The invention relates to apparatus and methods for facilitating greenhouse gas emission control through targeted asset management. The features and advantages of the invention will become more fully apparent from the following description and appended claims, or may be learned by practice of the invention as set forth hereinafter.

A method for facilitating greenhouse gas emission monitoring and control is disclosed herein. In one embodiment, such a method may include taking an inventory of selected GHG-producing assets of an enterprise and monitoring the GHG emission rate for each of the GHG-producing assets. If the GHG emission rate for a specific GHG-producing asset exceeds a specified rate limit, or if the growth rate of the GHG emission rate for the specific GHG-producing asset exceeds a specified growth rate limit, maintenance may be automatically scheduled for that GHG-producing asset.

Another aspect of the invention concerns an apparatus for facilitating greenhouse gas emission control. The apparatus comprises a GHG asset inventory module for taking an inventory of GHG-producing assets of an enterprise; a GHG sensor module for monitoring the GHG emission rate for each GHG-producing asset in the inventory; and an asset maintenance module for automatically scheduling maintenance for a specific GHG-producing asset in the inventory in the event at least one of the following occurs: (1) the GHG emission rate for the specific GHG-producing asset exceeds a specified rate limit; and (2) the growth rate of the GHG emission rate for the specific GHG-producing asset exceeds a specified growth rate limit.

A further aspect of the invention concerns a computer program product for facilitating greenhouse gas emission control. The computer program product comprises a non-transitory computer readable storage medium having computer readable program code embodied therewith. The computer readable program code is configured to take an inventory of GHG-producing assets of an enterprise, monitor the GHG emission rate for each GHG-producing asset in the inventory, and automatically schedule maintenance for a specific GHG-producing asset in the inventory in the event at least one of the following occurs: (1) the GHG emission rate for the specific GHG-producing asset exceeds a specified rate limit; and (2) the growth rate of the GHG emission rate for the specific GHG-producing asset exceeds a specified growth rate limit.

BRIEF DESCRIPTION OF THE SEVERAL VIEWS OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The described exemplary embodiments will be best understood by reference to the drawings, wherein like parts are designated by like numerals throughout.

As will be appreciated by one skilled in the art, the invention may be embodied as an apparatus, system, method, or computer program product. Furthermore, certain aspects of the invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, certain aspects of the invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the invention are described below with reference to flowchart illustrations and/or block diagrams of processes, apparatus, systems, and computer program products according to the embodiments. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Exemplary embodiments of the invention relate to apparatus and methods for efficiently gathering and using GHG emission information to reduce current and/or future GHG emissions. Beneficially, such apparatus and methods would identify business assets associated with excessive GHG emission levels and/or growth rates, and suggest suitable replacement assets or parts having reduced GHG emission levels and/or growth rates.

As used herein, the term "greenhouse gas-producing asset" or "GHG-producing asset" refers to any economic resource used by a business or enterprise that produces at least trace amounts of greenhouse gases as a byproduct of its operation. The term "resource" refers to any material or commodity used for a particular asset to operate or function. Generally, a resource may include fuel, oil, water, chemical products, or any other material or commodity needed for asset processes or operation.

Figure 1:
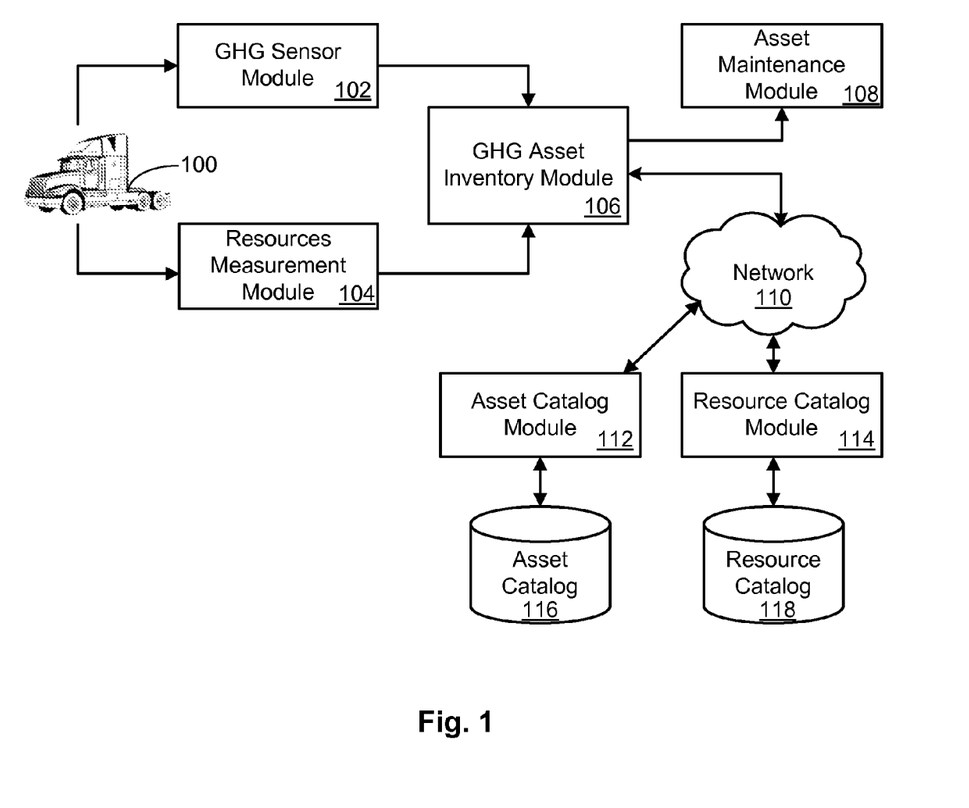
FIG. 1 is flow diagram showing an exemplary embodiment of a system for controlling greenhouse gas emissions in an enterprise.

Referring now to FIG. 1, an exemplary embodiment of a system for controlling greenhouse gas ("GHG") emissions in an enterprise is illustrated. In general, the system may monitor GHG-producing assets 100 used in the operation of the enterprise, and may identify problem assets 100 or other factors causing GHG emissions to exceed a predetermined target threshold. The system may further identify one or more courses of action to reduce GHG emissions, such as scheduling preventive maintenance, repairing or replacing certain assets 100 or parts thereof, or substituting assets or products having reduced GHG emissions for the current assets 100 or parts. In this manner, embodiments of the invention may control greenhouse gas emissions via the asset management and maintenance system.

A GHG-producing asset 100 may include, for example, a server, a data center, a vehicle, a power plant, a septic system, a refrigeration system, a fuel system, or any other asset used in the operation of a business or enterprise and producing measurable amounts of greenhouse gases during use. As shown in FIG. 1, A GHG sensor module 102 may communicate with the assets 100 or parts to measure and record levels of greenhouse gas emissions produced thereby. A GHG sensor module 102 in accordance with the invention may utilize, for example, electrochemical detectors, infrared sensors, semiconductor detectors, photoacoustic sensors, ultrasonic detectors, and/or any other types of sensors or monitoring systems suitable for measuring GHG emissions.

GHG emission information collected by the GHG sensor module 102 may be transmitted to a GHG asset inventory module 106 for cataloguing. As discussed in more detail below, the GHG asset inventory module 106 may store and keep track of an inventory of GHG-producing assets 100 of an enterprise. GHG emission information may be correlated with each asset 100 included in the inventory and may be stored in a GHG asset inventory database (not shown) communicating with the GHG asset inventory module 106.

In certain embodiments, the GHG sensor module 102 may measure greenhouse gas emission levels intermittently or periodically. The GHG asset inventory system 106 may correlate the emission levels with the times and/or frequency they were recorded, for example, and store this information in the GHG asset inventory database.

A resources measurement module 104 may be configured to monitor resources used by the GHG-producing assets 100. As in the GHG sensor module 102, the resources measurement module 104 may utilize various types of sensors or monitoring systems to measure the type and amount of resource used by various GHG-producing assets 100. This information may be provided to the GHG asset inventory module 106 such that the GHG asset inventory module 106 may correlate the resource-related information with the asset 100 that uses it, as well as the GHG emissions that were produced by the asset 100 while using the resource.

An asset maintenance module 108 may be configured to communicate with the GHG asset inventory module 106 to determine whether GHG emission levels associated with a particular asset 100 or resource are outside of a target GHG emission range. Based on this information, as discussed in more detail with reference to FIG. 2 below, the asset maintenance module 108 may generate a work order, generate a material purchase order, schedule preventive maintenance, and/or perform some other action to reduce the GHG emission levels or GHG emission growth rates for the asset 100. In certain embodiments, the asset maintenance module 108 may access a database storing manufacturer recommendations regarding asset maintenance, asset work order histories, and the like, in order to determine the proper action. As will be explained in more detail hereafter, this information may be used to replace current assets 100 or parts with new assets 100 or parts of the same type, or replace current assets 100 or parts with alternative assets 100 or parts demonstrating reduced GHG emissions.

In certain embodiments, the GHG asset inventory module 106 may communicate with an asset catalog module 112 and/or a resource catalog module 114 over a network 110, such as the Internet. The asset catalog module 112 (which may operate like a service provided over the Internet, for example) may use information provided by the GHG asset inventory module 106 to catalog the asset 100, define its business role or objective, and record its GHG emissions. In some embodiments, GHG emissions for the asset 100 may be recorded as an average over a period of time, as a range of values, or in any other suitable manner.

In certain embodiments, the asset catalog module 112 may interface with an asset catalog 116. This asset catalog 116 may store GHG emission and business role information associated for various different assets 100 to identify an appropriate substitute asset 100 for a GHG-producing asset 100. The asset catalog module 112 may identify, by evaluating the assets 100 stored in the asset catalog 116, a substitute asset 100 having a business role or function which is the same as or similar to the GHG-producing asset 100 but with a reduced level of GHG emissions. This information may be used to determine whether the asset 100 should be replaced with the substitute asset 100 to reduce GHG emissions.

In certain embodiments, the GHG asset inventory module 106 may also communicate with a resource catalog module 114 (which may also function as a service) over the network 110. The resource catalog module 114 may use information provided by the GHG asset inventory module 106 to identify alternative resources available on the market for use by the GHG-producing asset 100. In certain embodiments, the resource catalog module 114 catalogs, in a resource catalog 118, resources used by an asset 100, the associated GHG emissions, and any other relevant information. In certain embodiments, the resource catalog module 114 determines an appropriate substitute resource by comparing the resource currently being used with other resources. More specifically, the resource catalog module 114 may identify a substitute resource able to perform a function similar to the resource currently being used, while reducing GHG emissions.

Figure 2:
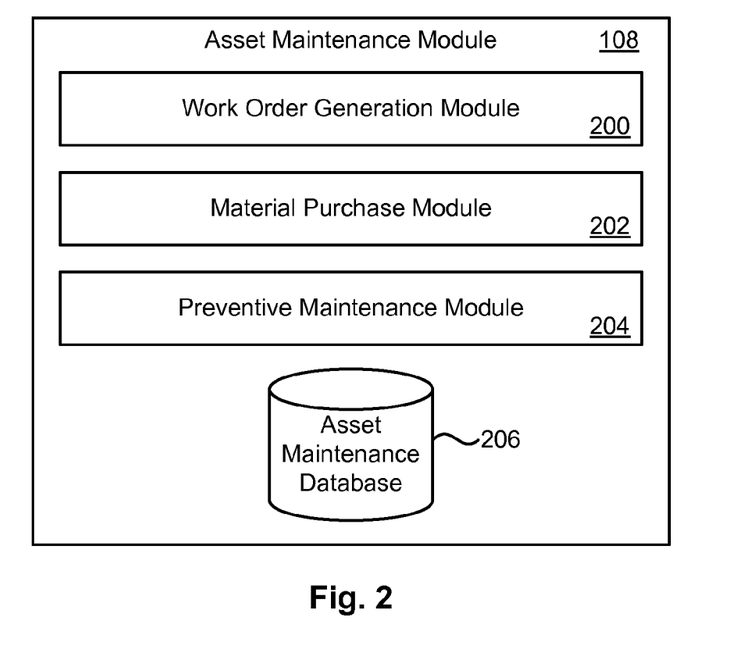
FIG. 2 is a block diagram of an exemplary embodiment of an asset maintenance module in accordance with the invention.

Referring now to FIG. 2, an exemplary embodiment of an asset maintenance module 108 in accordance with the invention is illustrated. In certain embodiments, the asset maintenance module 108 includes one or more of a work order generation module 200, a material purchase module 202, and a preventive maintenance module 204. In some embodiments, the asset maintenance module 108 may further include an asset maintenance database 206 storing a history of work orders, preventive maintenance, purchased materials, asset manufacturer recommendations, and the like.

In certain embodiments, a work order generation module 200 may generate a work order to repair a GHG-producing asset 100 or part thereof in the event GHG emissions for the asset 100 exceed one or more predetermined thresholds. Particularly, the work order generation module 200 may generate a work order if: (1) the GHG emission rate for the asset 100 or part thereof exceeds a specified rate limit, or (2) the growth rate of the GHG emission rate for a specific asset 100 or part exceeds a specified growth rate limit. If particular materials (e.g., parts, tools, supplies, etc.) are needed to perform a work order, the material purchase module 202 may order the necessary materials.

In certain embodiments, the work order generation module 200 may reference a work order history in the asset maintenance database 206 to determine whether repairing an asset 100 or part thereof (as opposed to replacing the asset or part) would likely be effective to reduce GHG emissions. For example, if the asset maintenance database 206 indicates that work orders have issued multiple times to repair the same asset 100 or part within a short period of time, the work order generation module 200 may determine that repairing the asset 100 or part may not be effective to remedy the problem. In such a case, the material purchase module 202 may generate a material purchase order to replace the asset 100 or part with a new asset 100 or part. Alternatively, if the asset maintenance database 206 indicates that the subject asset 100 or part is relatively new or has recently been replaced, the material purchase module 202 may generate a material purchase order to replace the asset 100 or part with an alternate or substitute asset 100 or part, as discussed in more detail below.

In one embodiment, the asset maintenance database 206 may include recommendations provided by an asset manufacturer or consumer regarding, for example, an optimal or desired utilization period. If the GHG emission or growth rate for a specific asset 100 or part exceeds the specified rate limit, the material purchase module 202 may access the asset maintenance database 206 to determine whether the recommended utilization period for the asset 100 or part has expired. If so, the material purchase module 202 may generate a material purchase order to replace the asset 100 or part with a new asset 100 or part, or to substitute the asset 100 or part with an alternate asset 100 or part.

In other embodiments, the material purchase module 202 may communicate with the GHG asset inventory module 106 (which may in turn communicate with the asset catalog 116) to identify a substitute asset 100 or part that satisfies the same business role and is interchangeable with a specific asset 100 or part, and that indicates an ability to reduce GHG emissions. Of course, the circumstances under which a material purchase module 202 may generate a material purchase order to replace the asset 100 or part with an alternate asset 100 or part is not limited to the exemplary cases set forth above, and may include any case where: (1) the GHG emission rate for a specific GHG-producing asset 100 or part exceeds a specified rate limit, or (2) the growth rate of the GHG emission rate for a specific GHG-producing asset 100 or part exceeds a specified growth rate limit.

The asset maintenance module 108 may also include a preventive maintenance module 204 to automatically schedule preventive maintenance for the GHG-producing asset 100 or part thereof in the event its GHG emission rate or GHG emission growth rate exceeds specified rate limits. Preventive maintenance may include, for example, tests, measurements, adjustments, minor parts replacement, and/or any other such care or servicing performed to correct incipient failures either before they occur, or before they develop into major defects.

Figure 3:
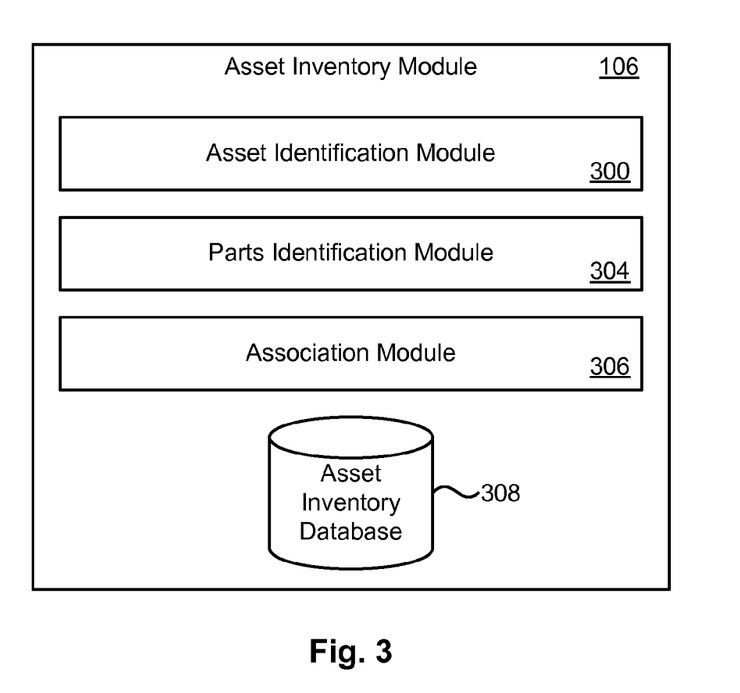
FIG. 3 is a block diagram of an exemplary embodiment of an asset inventory module in accordance with the invention.

Referring now to FIG. 3, one embodiment of an asset inventory module 106 in accordance with the invention is illustrated. In certain embodiments, the asset inventory module 106 includes one or more of an asset identification module 300, a parts identification module 304, and an association module 306. In certain embodiments, information generated by each of these modules 300, 304, 306 may be stored in an asset inventory database 308.

The asset identification module 300 may identify and store an inventory of GHG-producing assets 100 associated with an enterprise. An asset 100 may be defined at any desired level of granularity. For example, an asset 100 may include a data center (high-level granularity) or a server within the data center (low-level granularity). The granularity with which GHG-producing assets 100 are defined may depend, for example, on the sensitivity and application of GHG measurement tools, or other factors known to those in the art. In any event, the asset identification module 300 may identify and store an inventory of GHG-producing assets 100 of an enterprise, from which GHG emission levels may be monitored and analyzed.

A parts identification module 304 may reduce the inventory of GHG-producing assets 100 into component parts, where each part is responsible for some portion of GHG emissions from the asset 100. For example, a truck may include an engine, refrigeration unit, and generator, each of which may produce GHG emissions. In some embodiments, GHG emission levels for each part may be separately monitored and recorded to facilitate targeted identification of problem components and specific GHG emissions.

An association module 306 may associate specific GHG emissions, GHG emission rates, and GHG emission growth rates with each of the GHG-producing assets 100 and parts thereof identified by the asset identification module 300 and parts identification module 304.

Figure 4:
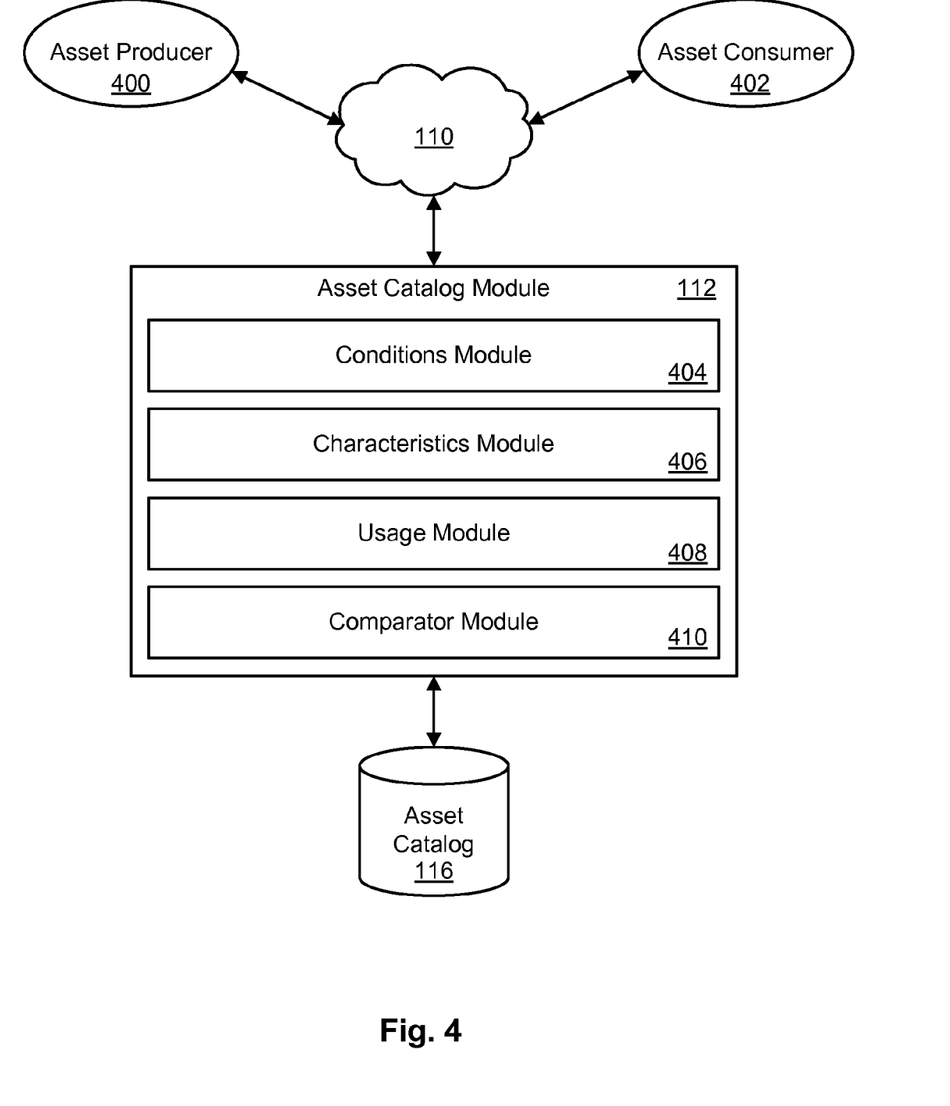
FIG. 4 is a flow chart showing one example of an asset catalog module in accordance with the invention.

Referring now to FIG. 4, a flow chart showing one example of an asset catalog module 112 and its function is illustrated. In general, the asset catalog module 112 may enable asset producers (e.g., asset manufacturers) and/or asset consumers (i.e., users of assets 100) to store and retrieve information associated with various types of assets. As shown in FIG. 1, a GHG asset inventory module 106 may communicate with an asset catalog module 112 to access data in the asset catalog 116. As discussed in more detail below, asset producers 400 may store information in the asset catalog 116 regarding assets they produce or manufacture, while asset consumers 402 may store information in the asset catalog 116 regarding assets 100 that are used in their enterprise.

In certain embodiments, the asset catalog module 112 may include one or more of a conditions module 404, a characteristics module 406, a usage module 408, and a comparator module 410. Each of these modules 404, 406, 408, 410 may interface with the asset catalog 116 to store and retrieve information therein. In certain embodiments, the asset catalog module 112 may require that sources providing information for inclusion in the asset catalog 116, such as asset producers 400 and asset consumers 402, satisfy certain certification requirements before such information is accepted and stored in the asset catalog 116. In this manner, embodiments of the invention may ensure that data contained in the asset catalog 116 is reliable.

In certain embodiments, the conditions module 404 may receive information from asset producers 400 regarding conditions relevant to measuring GHG emissions for various assets 100 in the asset inventory module 106. Such conditions may include, for example, temperature, humidity, atmosphere, resources quality, and any other such conditions known to those in the art to impact GHG emission performance. The conditions module 404 may correlate this information with the corresponding assets and store it in the asset catalog 116.

A characteristics module 406 may be used to manage information related to the characteristics of assets in the asset catalog 116. For example, the characteristics module 406 may receive, from asset producers 400, specifications information regarding general characteristics of assets 100 in the asset inventory. Such general characteristics may include, for example, asset category, capacity, and expected GHG emissions under various usage conditions. Of course, one skilled in the art will recognize that asset characteristics may vary depending upon the asset 100 and its usage in the enterprise. In certain embodiments, the characteristics module 406 may also receive information from asset consumers 402 regarding characteristics of specific assets 100 actually used in the enterprise. For example, an asset consumer 402 may provide actual GHG emissions averages for the asset 100 under real usage conditions and implemented options. These GHG emissions averages may vary from actual GHG emissions averages provided by other asset consumers 402. Accordingly, a range of actual GHG emissions averages, and other such information from multiple asset consumers 402, may be recorded and stored in the asset catalog 116.

A usage module 408 may be used to manage information in the asset catalog 116 related to the usage of assets. For example, the usage module 408 may receive from asset producers 400 expected uses of GHG-producing assets 100 and store this information in the asset catalog 116. Similarly, the usage module 408 may receive from asset consumers 402 varying actual uses of the asset 100 and store this information in the asset catalog 116. This information, combined with the other information received and stored by the other modules 404, 406, 410 of the asset catalog module 112, may facilitate informed decisions regarding asset use and associated real or projected impact on GHG emissions.

Finally, a comparator module 410 may be used by asset producers 400 and consumers 402 to compare various assets in the asset catalog 116. For example, in certain embodiments, the comparator module 410 may retrieve information from the asset catalog 116 regarding assets 100 having the same or similar features, usages, and environmental conditions as an asset 100 currently being used by an asset consumer 402. The asset consumer 402 may then determine whether it would be wise to replace the asset 100 with an asset have better performance and/or reduced GHG emissions. Thus, the comparator module 410 may be used to compare assets 100 with similar assets 100 to identify assets 100 having improved performance and/or reduced GHG emissions.

Figure 5:
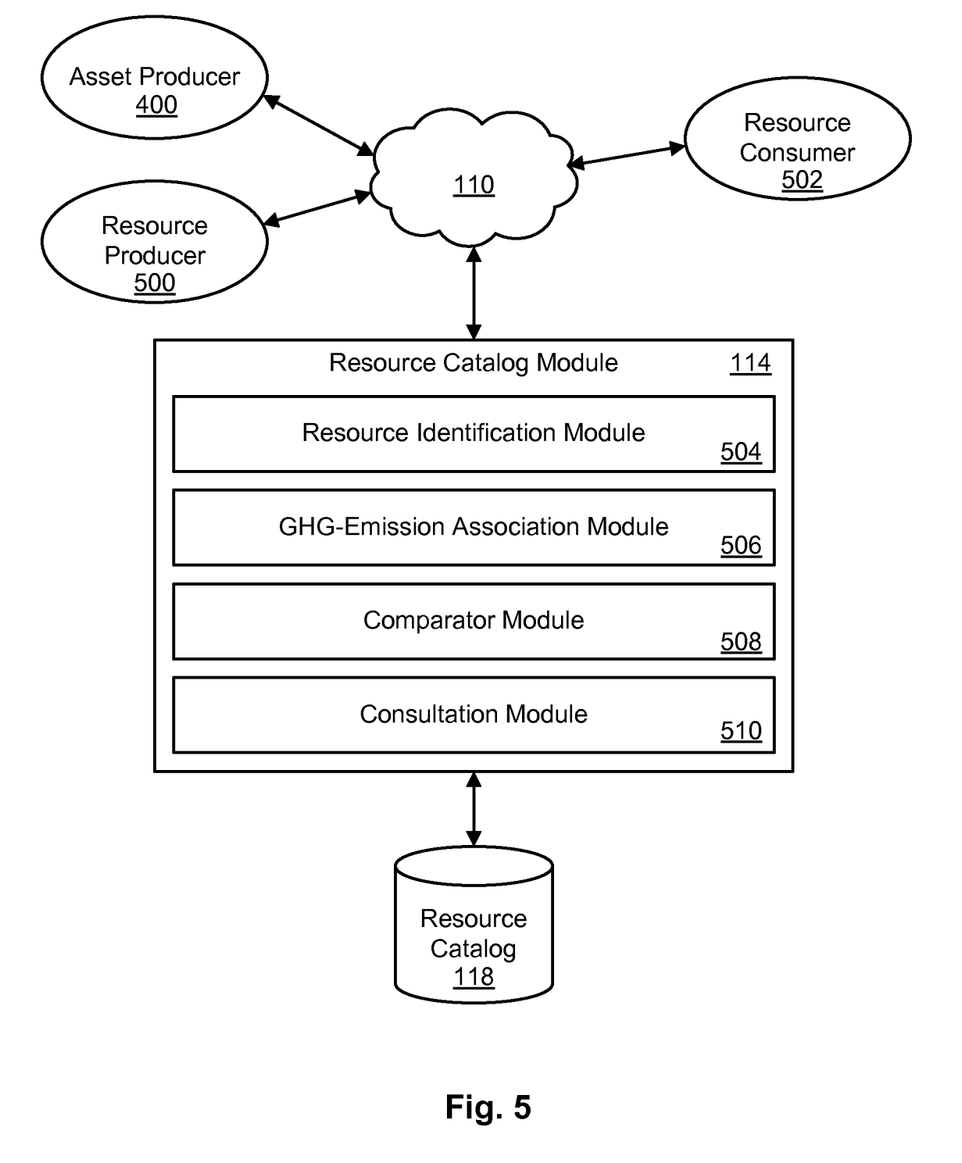
FIG. 5 is a flow chart showing one example of a resource catalog module in accordance with the invention.

Referring now to FIG. 5, in selected embodiments, a resource catalog module 114 may facilitate decision-making and GHG emission control with respect to resources used for asset 100 operation and processes. Like the asset catalog module 112, the resource catalog module 114 may receive resource-specific information over a network 110 such as the Internet from asset producers 400, resource producers 500, and/or resource consumers 502. In some embodiments, source identities may be verified prior to enabling information provided thereby to be stored in the resource catalog 118. In this manner, embodiments of the invention may promote the integrity and reliability of information stored in the resource catalog 118.

In certain embodiments, the resource catalog module 114 includes one or more of a resource identification module 504, a GHG-emission association module 506, a comparator module 508, and a consultation module 510. Each of the modules 504, 506, 508 and 510 may communicate with a resource catalog 118 to store and retrieve resource-specific information.

The resource identification module 504 may identify resources required for asset 100 processes, such as production, cleaning, operation, and the like. In some embodiments, the resource identification module 504 may identify resources associated with each asset 100 or part included in the asset inventory 308. Identified resources may be stored in the resource catalog 118.

In some embodiments, the resource identification module 504 may further identify expected and actual GHG emissions associated with consumption of each resource. Expected or average GHG emission information may be provided by, for example, resource producers 500 submitting general information regarding various resources, and asset producers 400 submitting general information pertaining to resources consumed by particular assets 100 and asset 100 processes. Actual GHG emission information may be provided by, for example, resource consumers 502 having observed values and information regarding GHG emission performance for a certain resource under certain conditions. Actual and expected GHG emission information may include, for example, percentages and amounts of various greenhouse gases produced under certain defined conditions and usages.

The GHG-emission association module 506 may associate GHG emissions monitored and measured by the resources measurement module 104 with each of the resources identified by the resource identification module 504. In certain embodiments, the GHG-emission association module 506 may further associate the times or frequencies at which the measurements were taken with the identified resources.

The comparator module 508 may receive information from a resource consumer 502 regarding conditions of consumption and usage for a particular resource. The comparator module 508 may then retrieve information from the resource catalog 118 regarding other resources having similar conditions of consumption and usage. GHG emission information for the actual resource may be compared to GHG emission information for the other resources to facilitate identification of alternate resources likely to exhibit similar performance with reduced GHG emissions relative to a current resource.

Finally, a consultation module 510 may enable a resource consumer 502 to prioritize results of the comparison performed by the comparator module 508. For example, in some embodiments, the consultation module 510 may prioritize a specific greenhouse gas to be filtered, specific performance values to be achieved, or the like, depending on input from the resource consumer 502.

Figure 6:
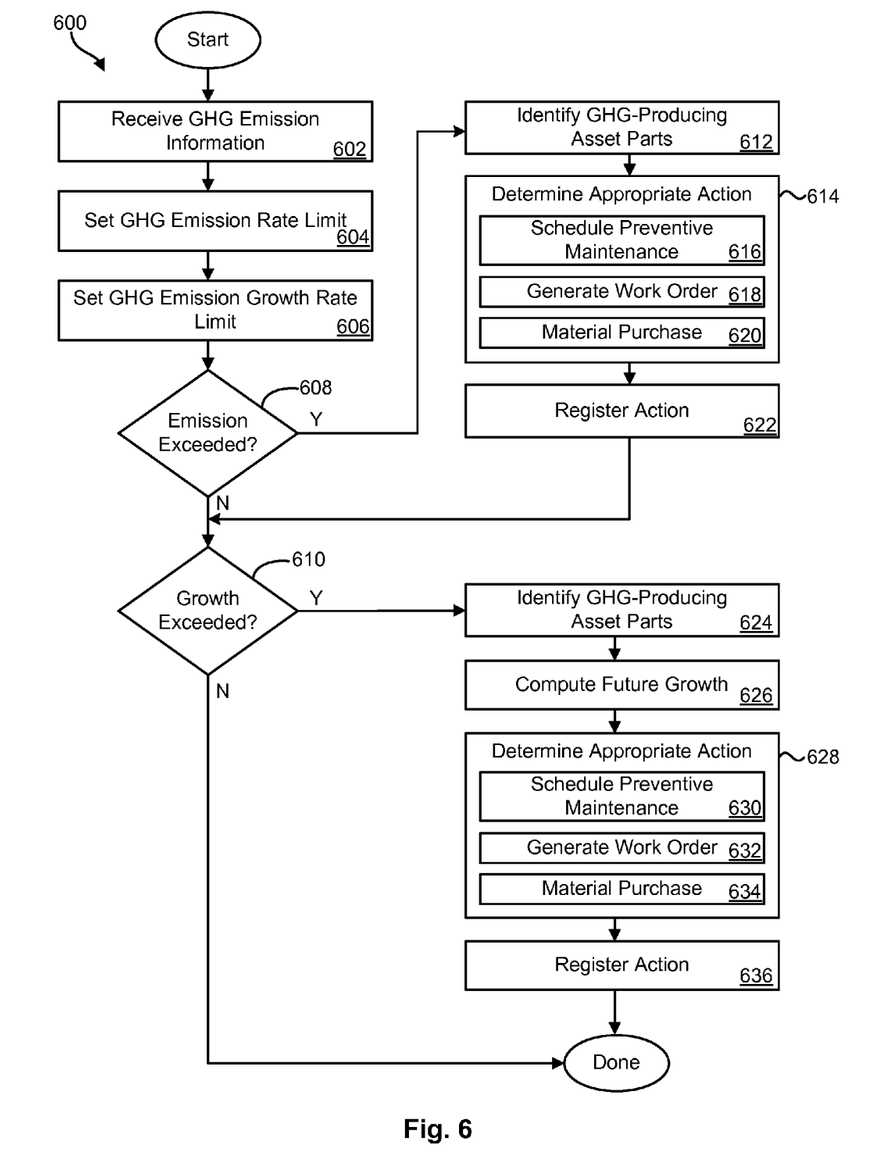
FIG. 6 is a flow chart showing an exemplary embodiment of a method for controlling greenhouse gas emissions in an enterprise.

Referring now to FIG. 6, one embodiment of a method 600 for controlling greenhouse gas emissions for an enterprise is illustrated. Such a method 600 may be executed by the asset maintenance module 108. As shown, the method 600 may include receiving 602 GHG emission information relevant to an enterprise. Receiving such GHG emission information may include, for example, receiving an inventory of GHG-producing assets 100, parts, and/or resources in an enterprise, and receiving observed GHG emission values associated with each. GHG emission values may include, for example, observed GHG emission rates and GHG emission growth rates corresponding to the various assets 100, parts and resources inventoried. In some embodiments, this information may be provided automatically by a GHG inventory system, such as the asset inventory module 106 discussed above.

A GHG emission rate limit may be set 604 as a threshold for overall GHG emissions, by specific greenhouse gas, or by any other manner known to those in the art. A GHG emission growth rate limit may be set 606 as a threshold for measured GHG emission growth rate values.

GHG emission rate values corresponding to each asset 100, part, or resource may be compared 608 to the established GHG emission rate limit to determine whether GHG emissions for that particular asset 100, part, or resource have exceeded an acceptable level. If yes, such GHG-producing assets 100, parts, and/or resources may be identified 612 and an appropriate action determined 614 based on, for example, the identified asset 100, part, or resource, a history of previous actions taken with respect to the identified asset 100, part, or resource, the magnitude of the difference between the observed GHG emission rate and the established GHG emission rate limit, the availability and cost associated with new or alternative assets 100, parts, or resources, and/or any other factor or combination of factors known to those in the art.

An appropriate action may include, for example, scheduling 616 preventive maintenance, generating 618 a work order to repair the subject asset 100, part or resource, and/or generating 620 a material purchase order to replace the subject asset 100, part or resource with a new or alternative asset 100, part or resource. In some embodiments, alternative assets 100, parts or resources may be identified by accessing or consulting a database or other system providing a comparison of various assets 100, parts and resources, their associated or possible functions and features, and associated or predicted GHG emission rate values.

Upon executing the appropriate action, the action taken may be registered 622 in a database or other system known to those in the art and, in some embodiments, associated with an existing history relevant to the asset 100, part or resource. In certain embodiments, registering 622 the action may further include identifying and recording the root cause of the excessive GHG emission rate, and improvements expected based on the action taken.

Upon registering 622 the action, a GHG emission growth rate associated with the asset 100, part or resource (and included in the GHG emission information) may be compared to the established GHG emission growth rate. Alternatively, in the event the GHG emission rate limit has not been exceeded, a GHG emission growth rate associated with a particular asset 100, part or resource may be compared 610 to the established GHG emission growth rate limit.

If the GHG emission growth rate for the asset 100, part or resource has exceeded the established GHG emission growth rate limit, the responsible asset 100, part or resource may be identified 624. Upon such identification 624, expected future growth may be computed 626 by regression, for example, for the asset 100, part or resource. Expected future growth may be taken into account, along with other relevant factors, to determine 628 an appropriate course of action. Other relevant factors may include, for example, the identity of the identified asset 100, part, or resource, a history of previous actions taken with respect to the identified asset 100, part, or resource, the magnitude of the difference between the observed GHG emission growth rate or expected GHG emission growth rate and the established GHG emission growth rate limit, the availability and cost associated with new or alternative assets 100, parts, or resources, and/or any other factor or combination of factors known to those in the art.

An appropriate action may include, for example, scheduling preventive maintenance 630, generating 632 a work order to repair the subject asset 100, part or resource, or generating 634 a material purchase order to replace the subject asset 100, part or resource with a new or alternative asset 100, part or resource. In some embodiments, alternative assets 100, parts or resources may be identified by accessing or consulting a database or other system providing a comparison of various assets 100, parts and resources, their associated or possible functions and features, and associated or predicted GHG emission growth rate values.

Upon executing the appropriate action, the action taken may be registered 636 in a database or other system known to those in the art and, in some embodiments, associated with an existing history relevant to the asset 100, part or resource. In certain embodiments, registering 636 the action may further include identifying and recording the root cause of the excessive GHG emission growth rate, and recording improvements expected based on the action taken.

The flowchart and block diagrams in the Figures illustrate the architecture, functionality, and operation of possible implementations of systems, processes, and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A computer-implemented method for facilitating greenhouse gas emission control, the method comprising:
   taking an inventory of greenhouse gas ("GHG")-producing assets of an enterprise by a GHG inventory module coupled to the GHG-producing assets, wherein the inventory is generated to indicate for at least one of the GHG producing assets, component parts of the GHG producing asset responsible for a portion of GHG emissions from the GHG producing asset;
   monitoring the GHG emission rate for each GHG-producing asset in the inventory by a GHG sensor module coupled to the GHG-producing assets;
   monitoring the GHG emission rate of at least one part of at least one of the monitored GHG producing assets indicated in the inventory by the GHG sensor module coupled to the GHG producing assets; and
   automatically scheduling maintenance for a specific GHG-producing asset in the inventory, by an asset maintenance module executed by a computer processor, in the event the following occurs: (1) the GHG emission rate for the specific GHG-producing asset and the component part of the GHG producing asset exceeds a specified rate limit; and (2) the growth rate of the GHG emission rate for the specific GHG-producing asset and the component part of the GHG producing asset exceeds a specified growth rate limit.

2. The method of claim 1, wherein automatically scheduling maintenance comprises scheduling preventive maintenance for the GHG-producing asset.

3. The method of claim 1, wherein automatically scheduling maintenance comprises generating a work order to at least one of repair and replace the GHG-producing asset.

4. The method of claim 1, wherein automatically scheduling maintenance comprises:
   identifying an alternate asset configured to perform a function substantially equivalent to that of the GHG-producing asset and associated with at least one of a reduced GHG emission rate and a reduced GHG growth rate; and
   purchasing the alternate asset to replace the GHG-producing asset.

5. The method of claim 4, wherein identifying the alternate asset comprises referencing an assets catalog associating alternate assets with the GHG-producing assets.

6. The method of claim 1, wherein automatically scheduling maintenance comprises:
   determining which part of the GHG-producing asset is causing the GHG-producing asset to exceed at least one of the specified rate limit and the specified growth rate limit; and
   generating a work order to at least one of repair and replace the part.

7. The method of claim 1, wherein automatically scheduling maintenance comprises:
   determining which part of the GHG-producing asset is causing the GHG-producing asset to exceed at least one of the specified rate limit and the specified growth rate limit;
   identifying an alternate part configured to perform a function substantially equivalent to that of the part and associated with at least one of a reduced GHG emission rate and a reduced GHG growth rate; and
   purchasing the alternate part to replace the part.

8. The method of claim 7, wherein identifying the alternate part comprises referencing an assets catalog associating alternate parts with the parts.

9. The method of claim 1, wherein automatically scheduling maintenance comprises:
   identifying a resource used to operate the GHG-producing asset that is causing the GHG-producing asset to exceed at least one of the specified rate limit and the specified growth rate limit;
   identifying an alternate resource for operating the GHG-producing asset, wherein the alternate resource is associated with at least one of a reduced GHG emission rate and a reduced GHG growth rate; and
   purchasing the alternate resource to replace the resource.

10. The method of claim 9, wherein identifying the alternate resource comprises referencing a resources catalog associating alternate resources with the resources used to operate the GHG-producing asset.

11. An apparatus for facilitating greenhouse gas emission control, the apparatus comprising:
   a processor; and
   a memory having program code modules executed by the processor to perform operations, the modules comprising:

a greenhouse gas ("GHG") asset inventory module configured to take an inventory of GHG-producing assets of an enterprise coupled to the GHG-producing assets wherein the inventory is generated to indicate for at least one of the GHG producing assets, component parts of the GHG producing asset responsible for a portion of GHG emissions from the GHG producing asset;

a GHG sensor module configured to monitor the GHG emission rate for each GHG-producing asset in the inventory and monitor the GHG emission rate of at least one part of at least one of the monitored GHG producing assets indicated in the inventory by the GHG sensor module coupled to the GHG producing assets and an asset maintenance module configured to automatically schedule maintenance for a specific GHG-producing asset in the inventory in the event the following occurs: (1) the GHG emission rate for the specific GHG-producing asset and the component part of the GHG producing asset exceeds a specified rate limit; and (2) the growth rate of the GHG emission rate for the specific GHG-producing asset and the component part of the GHG producing asset exceeds a specified growth rate limit.

12. The apparatus of claim 11, further comprising a resources control module configured to compute and store resources used by the GHG-producing assets.

13. The apparatus of claim 12, further comprising a resource catalog module configured to associate alternate resources with the resources used by the GHG-producing assets.

14. The apparatus of claim 11, further comprising an asset catalog module configured to associate alternate assets with the GHG-producing assets.

15. The apparatus of claim 14, wherein the asset catalog module further associates alternate parts with GHG-producing asset parts.

16. The apparatus of claim 11, further comprising an asset maintenance database configured to store at least one of work order histories, preventive maintenance information, material purchase records, and asset manufacturer recommendations.

17. The apparatus of claim 11, further comprising an asset inventory database configured to store at least one of GHG emission information for each GHG asset, recorded GHG emission levels, emission recording times, emission recording frequencies, GHG asset identifiers, and GHG part identifiers.

18. A computer program product comprising a non-transitory computer readable storage medium having computer readable program code embodied therewith, the computer readable program code comprising:

computer readable program code executable by a processor to take an inventory of greenhouse gas ("GHG") producing assets of an enterprise coupled to the code, wherein the inventory is generated to indicate for at least one of the GHG producing assets, component parts of the GHG producing asset responsible for a portion of GHG emissions from the GHG producing asset;

computer readable program code executable by a processor to monitor the GHG emission rate for each GHG-producing asset in the inventory and to monitor the GHG emission rate of at least one part of at least one of the monitored GHG producing assets indicated in the inventory by the GHG sensor module coupled to the GHG producing assets; and computer readable program code executable by a processor to automatically schedule maintenance for a specific GHG-producing asset in the inventory in the event the following occurs: (1) the GHG emission rate for the specific GHG-producing asset and the component part of the GHG producing asset exceeds a specified rate limit; and (2) the growth rate of the GHG emission rate for the specific GHG-producing asset and the component part of the GHG producing asset exceeds a specified growth rate limit.

19. The computer program product of claim 18, wherein the automatic scheduling of maintenance comprises at least one of scheduling preventive maintenance for the GHG-producing asset, generating a work order to repair the GHG-producing asset, generating a work order to replace the GHG-producing asset, and purchasing an alternate asset to replace the GHG-producing asset.

20. The computer program product of claim 18, wherein the computer readable program code comprises:

computer readable program code executable by a processor to determine which part of the GHG-producing asset is causing the GHG-producing asset to exceed at least one of the specified rate limit and the specified growth rate limit; and computer readable program code executable by a processor to generate a work order to at least one of repair and replace the part.

21. The computer program product of claim 18, wherein the computer readable program code comprises:

computer readable program code executable by a processor to determine which part of the GHG-producing asset is causing the GHG-producing asset to exceed at least one of the specified rate limit and the specified growth rate limit;

computer readable program code executable by a processor to identify an alternate part configured to perform a function substantially equivalent to that of the part and associated with at least one of a reduced GHG emission rate and a reduced GHG growth rate; and computer readable program code executable by a processor to purchase the alternate part to replace the part.

22. The computer program product of claim 18, wherein the computer readable program code comprises:

computer readable program code executable by a processor to identify a resource used to operate the GHG-producing asset that is causing the GHG-producing asset to exceed at least one of the specified rate limit and the specified growth rate limit;

computer readable program code executable by a processor to identify an alternate resource for operating the GHG-producing asset, wherein the alternate resource is associated with at least one of a reduced GHG emission rate and a reduced GHG growth rate; and computer readable program code executable by a processor to purchase the alternate resource to replace the resource.

23. The computer program product of claim 18, further comprising an asset maintenance database for storing at least one of work order histories, preventive maintenance information, material purchase records, and asset manufacturer recommendations.

24. The computer program product of claim 18, further comprising an asset inventory database for storing at least one of GHG emission information for each GHG asset, recorded GHG emission levels, emission recording times, emission recording frequencies, GHG asset identifiers, and GHG part identifiers.

25. The method of claim 1, wherein the method further comprises:

provide, by the GHG asset inventory module, information on the inventory of GHG-producing assets to an asset catalog module which stores the information on the GHG producing assets in an asset catalog accessible to manufacturers and users of the GHG producing assets indicated in the catalog, wherein the asset catalog includes GHG emissions on the GHG-producing assets in the inventory.

26. The apparatus of claim 11, wherein the GHG asset inventory module further provides information on the inventory of GHG-producing assets to an asset catalog module which stores the information on the GHG producing assets in an asset catalog accessible to manufacturers and users of the GHG producing assets indicated in the catalog, wherein the asset catalog includes GHG emissions on the GHG-producing assets in the inventory.

27. The computer program product of claim 18, wherein the GHG asset inventory module further provides information on the inventory of GHG-producing assets to an asset catalog module which stores the information on the GHG producing assets in an asset catalog accessible to manufacturers and users of the GHG producing assets indicated in the catalog, wherein the asset catalog includes GHG emissions on the GHG-producing assets in the inventory.

* * * * *